United States Patent Office 2,921,926
Patented Jan. 19, 1960

2,921,926

IMPROVED PROCESS FOR SULFUR-CURING POLYURETHANE ELASTOMERS

Clifton L. Kehr, Wilmington, Del., assignor to E. I. du Pont de Nemours and Company, Wilmington, Del., a corporation of Delaware No Drawing. Application July 2, 1957
Serial No. 669,444

8 Claims. (Cl. 260—77.5)

This invention is directed to an improved process for sulfur-curing polyalkyleneether polyurethane elastomers which employs zinc salts and cadmium salts together as activators.

Polyalkyleneether polyurethane polymers having side chains containing C=C curing sites which are vulcanized by sulfur have been found to possess properties which are much superior to those exhibited by products obtained from polyalkyleneether polyurethane polymers having recurring urea groups in the chain which have been cured by using organic diisocyanates. However, considerable difficulty has been encountered in exploiting these side chain C=C curing sites because they are not affected satisfactorily by the conventional sulfur curing systems which are used for natural rubber, GR–S and neoprene; the curing cycle requires more time than is permissible for a commercial curing process.

Zinc halide and zinc halide complexes of 2-mercaptobenzothiazole and 2,2'-dithiobisbenzothiazole may be used to activate the sulfur curing of ethylenically unsaturated polyalkyleneether polyurethane elastomers. Although these accelerators are substantially better than the ones previously existing, the curing time required when they are used is still not as short as desirable.

It is, therefore, an object of the present invention to provide an improved process for the sulfur curing of polyurethane polymers having side chains containing C=C curing sites. It is a further object to provide accelerator combinations which will achieve a more rapid vulcanization of the sulfur-curable polyurethane polymers than possible heretofore.

These and other objects will become apparent in the following description and claims.

The present invention is directed to a process of curing a sulfur-curable polyalkyleneether polyurethane elastomer, said polymer having a side chain containing a terminal —CH=CH$_2$ group at least once for every 8000 units of molecular weight of polymer, by heating with sulfur, 2-mercaptobenzothiazole, and 2,2'-dithiobisbenzothiazole, the improvement of conducting said heating in the presence of 0.03–0.20 part of zinc and 0.045–0.45 part of cadmium per 100 parts by weight of polymer: (1) in the form of their salts, at least one of said salts being a chloride or a bromide or an iodide or (2) complexes of said salts with 2-mercaptobenzothiazole or 2,2'-dithiobisbenzothiazole or heterocyclic tertiary amines having at least one unsubstituted position alpha to the N-atom.

An outstanding improvement in the cure occurs when cadmium salts are present in addition to the previously known zinc salt curing accelerators. This result is entirely unexpected because the cadmium salts by themselves are mediocre curing accelerators. When both a zinc salt and a cadmium salt are present, the cure obtained is far better than that which either alone can produce. Example 1 demonstrates this synergistic effect. After a 20-minute cure at 150° C. the vulcanizate containing zinc chloride as the accelerator has a 70° C. compression set of 50%; when cadmium chloride is substituted for zinc chloride, the vulcanizate has a 70° C. compression set of 94%; when both accelerators are present, the 70° C. compression set of the cured elastomer is only 28%.

In order to get the most effective results it is recommended that the concentration ranges specified above be observed. When both the zinc and cadmium are present at concentrations below the minimum levels recommended, the vulcanizate properties become much less attractive. When only the cadmium concentration is low the synergistic effect is no longer significant and the curing acceleration obtained seems to be dependent on the zinc concentration alone. When only the zinc concentration is too low, the cure obtained is not satisfactory; it has already been pointed out that the cadmium salts are not suitable curing accelerators by themselves.

It is necessary that at least one member of the curing combination used be a chloride, bromide, or iodide. The chlorides are preferred. When neither the zinc compound nor the cadmium compound is one of these halides, the vulcanizates are very slow curing. For example, very poor results are obtained when both zinc and cadmium are present together as stearates.

These chlorides, bromides, and iodides may be added as the free halides or they may be introduced as complexes. In the latter case the halides can be combined with heterocyclic tertiary amines, 2-mercaptobenzothiazole, 2,2'-dithiobisbenzothiazole, acetonitrile, and triphenylphosphine.

Complexes of the zinc or cadmium halides with certain heterocyclic tertiary amines may be used in place of the free halides. Representative examples are:

$CdCl_2 \cdot$ (quinoline), $CdCl_2 \cdot$ (pyridine)$_2$ $ZnCl_2 \cdot$ (quinoline), $ZnCl_2 \cdot$ (quinoline)$_2$ $ZnCl_2 \cdot$ (pyridine)$_2$ and $ZnCl_2 \cdot$ ($\gamma$-picoline)$_2$ The heterocyclic tertiary amine should have a free position alpha to the nitrogen atom. 2,6-lutidine, which is substituted at both alpha positions, does not form a complex with zinc chloride. Primary and secondary amines, in general, are not recommended because they exert a peptizing effect on the polyurethane polymer chains if they are released during the curing operation.

The heterocyclic tertiary amine complex may be introduced as an inactive hydrochloride from which it is liberated by reaction with an inactive basic salt or oxide of the other member of the combination. The salt or oxide is converted to the corresponding chloride in the process. Quinolinium tetrachlorozincate and the cadmium salt of 2-mercaptobenzothiazole can react as follows to give the synergistic curing combination of zinc chloride·(quinoline)$_2$ and cadmium chloride.

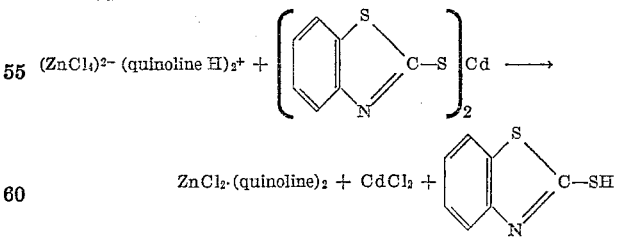

Other representative examples of combinations of this sort are:

Zn stearate+(CdCl$_3$)$^-$(pyridine H)$^+$

ZnO+(CdCl$_3$)$^-$(pyridine H)$^+$

CdO+(ZnCl$_4$)$^{2-}$(quinoline H)$_2$$^+$

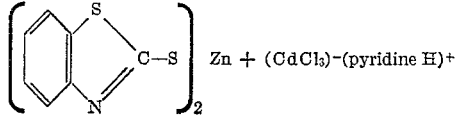

The 1:1 molar complex of zinc chloride (or bromide or iodide) with 2,2'-dithiobisbenzothiazole may be employed in place of the free halides. Likewise the 1:2 molar complex of these zinc halides with 2-mercaptobenzothiazole may also be used.

Both zinc and cadmium halides may be contained in a single complex. For example, cadmium chloride can be incorporated into a complex which has the following structure

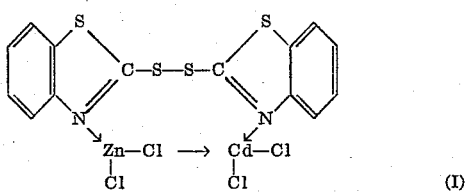

Cadmium chloride, bromide, or iodide will react with a zinc halide·(2-mercaptobenzothiazole)$_2$ complex to form a new complex with the liberation of a molecule of hydrogen halide as shown by the following equation.

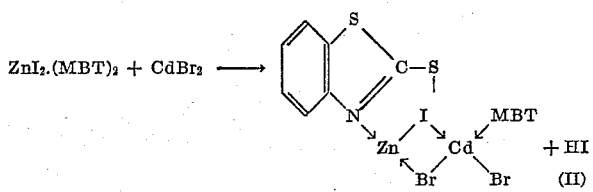

where MBT stands for 2-mercaptobenzothiazole. These complexes may be employed in the subject invention.

The zinc chloride:cadmium chloride:2,2'-dithiobisbenzothiozole complex (I) is prepared by agitating stoichiometric amounts of cadmium chloride and the zinc chloride:2,2'-dithiobisbenzothiazole complex in refluxing o-xylene for about 10 hours and collecting the insoluble product. Complexes such as II are similarly prepared by the reaction of cadmium halides with zinc halide:2 (2-mercaptobenzothiazole) complexes; a mole of hydrogen halide is given off for every mole of complex formed.

The zinc halide:2,2'-dithiobisbenzothiazole complexes are formed by agitating the zinc halide with a stoichiometric amount of the organic compound in an inert medium under abrading conditions.

The zinc and cadmium mercaptides of 2-mercaptobenzothiazole are prepared by treating an ethanolic solution of sodium acetate and the sodium salt of 2-mercaptobenzothiazole by dropwise addition of an aqueous solution of cadmium (or zinc) chloride and sodium acetate and separating the precipitated cadmium (or zinc) salt of 2-mercaptobenzothiazole. The heterocyclic tertiary amine complexes of the cadmium and zinc halides are made by treating a dilute alcoholic solution of the halide with the stoichiometrically required amount of the heterocyclic amine. The complex precipitates from solution. The preparation of these complexes is described by [W. Lang, Ber., 21, 1579, 1584 (1888)], [E. Borsbach, Ber., 23, 436 (1890)], [H. Schiff, Ann., 131, 112 (1864)], [A. Naumann, Ber., 47, 250 (1914)], [Evans et al., J. Chem. Soc., 1940, 1209, 1230]. Heterocyclic tertiary amine hydrochloride complexes of cadmium and zinc halides e.g., quinolinium tetrachlorozincate

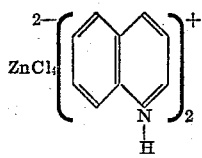

are made by treating the heterocyclic tertiary amine complex with concentrated hydrochloric acid. The preparation of these complexes is described by [H. Schiff, Ann., 131, 112, 113 (1864)], [Dubsky and Dostol, C.A., 29, 2109[7] (1935)], [E. Borsbach, Ber., 23, 436 (1890)], [H. Grossmann, Ber., 37, 567 (1904)].

The amount of sulfur which is used may range from about 0.5 to 2 parts per 100 parts of polyurethane polymer. It is to be understood that somewhat greater or lesser amounts of sulfur may be used with the greater amounts giving a progressively increasing tighter cure which is shown by an increased modulus. The amount of 2,2'-dithiobisbenzothiazole which is used should range from 2 to 4 parts per 100 parts of elastomer; however, it is to be understood that here again greater or lesser amounts may be used. In general, it is desirable to have a weight ratio of sulfur to 2,2'-dithiobisbenzothiazole of less than 1:1, with a preferred weight ratio range being from 1:2 to 1:4. The amount of 2-mercaptobenzothiazole which is used should range from 0.45 to 1 part per 100 parts of elastomer; however, greater or lesser amounts may be used.

Conventional elastomer processing steps may be used in the fabrication of cured articles. In carrying out the process of the present invention for molded articles, the uncured polyurethane polymer is normally milled to a smooth sheet on a rubber mill and the various ingredients are incorporated with the polymer on the mill. The stock is finally sheeted off the mill and placed in a suitable mold, which is then closed. The curing process is completed by heating the mold. Pressure may be applied if desired. The temperature and time used to effect a cure are interrelated; higher temperatures require shorter times and vice versa. There is, of course, an upper limit on the temperature which may be used; however, in general temperatures of from about 100–170° C. are useful with curing times of from about 10 minutes to 3 hours. The preferred temperature is about 140° C.

As has been mentioned above, the polyurethane polymers which are cured according to the process of the present invention have side chains containing terminal —CH=CH$_2$ groups. These unsaturated side chains are the curing sites utilized by the sulfur curing process of the present invention. There should be at least one of these side chains present for every 8000 units of molecular weight of polymer in order to assure the presence of a sufficient number of sites so that the polymer can be effectively cured. More side chains may be present and the number of side chains may be in excess of the number actually utilized in the curing step. On the average, it is preferred to have not more than about one side chain per 500 units of molecular weight of polymer. Polymer A, whose preparation is described just before the examples has a side chain for about each 2650 units of molecular weight.

The polymers which may be cured according to the process of the present invention are wholly polyurethane polymers and they have side chains containing terminal aliphatic —CH=CH$_2$ groups. In general, these polymers may be prepared by reacting a polyalkyleneether glycol, having a molecular weight of from about 750 to 10,000, with a molar excess of an organic diisocyanate, such as toluene-2,4-diisocyanate, followed by the reaction with a non-polymeric glycol, such as a propanediol, with the side chain containing terminal —CH=CH$_2$ groups being present on any of these reactants. The reaction involved is between the terminal hydroxyl groups of the glycols with the terminal isocyanate groups of the organic diisocyanate so as to yield a polyurethane polymer. Another method which may be used is to first react the non-polymeric glycol with a molar excess of an organic diisocyanate and then react this isocyanate-terminated intermediate with a polyalkyleneether glycol.

In addition to the above-discussed methods, polyurethane polymers which may be cured according to the process of the present invention may be prepared by reacting the polyalkyleneether glycol and the non-polymeric glycol with phosgene so as to form the bis-chloroformates which may then be reacted with a primary diamine so as to provide a polyurethane polymer. Instead of utilizing a primary diamine, a secondary diamine may be used, in which case the resulting polyurethane polymer will have no urethane nitrogens substituted with hydrogen.

The polyalkyleneether glycols which are useful in the preparation of the polyurethane polymers which may be cured according to the process of the present invention are compounds which have the general formula $HO(RO)_nH$ wherein R is a divalent alkylene radical and $n$ is an integer sufficiently large that the glycol has a molecular weight of at least 750. Not all the alkylene radicals present need be the same. These glycols may be derived by the polymerization of cyclic ethers, such as alkyleneoxides or dioxolane or by the condensation of glycols. The preferred polyalkyleneether glycol is polytetramethyleneether glycol, also known as poly-n-butyleneether glycol. Polyethyleneether glycol, polypropyleneether glycol, ethylene-oxide-modified-polypropyleneether glycol, 1,2-polydimethylethyleneether glycol and polydecamethyleneether glycol are other typical representatives of this class.

The non-polymeric glycols which are used in the preparation of these polyurethane polymers are compounds which should have molecular weights below about 200. In general, it is desirable that the side chain containing the terminal aliphatic $-CH=CH_2$ group be introduced into the polyurethane polymer by means of this non-polymeric glycol reactant. Representative compounds which may be used include 3-allyloxy-1,5-pentanediol, 3-(allyloxy)-1,2-propanediol, 2-[(allyloxy)methyl]-2-methyl-1,3-propanediol, 2,2'-(4-allyl-m-phenylenedioxy)diethanol, 3-(4-allyl-2-methoxyphenoxy)-1,2-propanediol, 3-allyloxy-1,2-propanediol, 2-[(allyloxy)ethyl]-1,3-propanediol, 2-[(allyloxy)ethyl]-2-methyl-1,3-propanediol, 2-methyl-2-[(10-undecenyloxy)methyl]-1,3-propanediol, 2,2'-(allylimino)-diethanol, 2-[(allyloxy)methyl]-1,3-propanediol, and 3-(4-allyl-2-methoxyphenoxy)-1,2-propanediol.

Any of a wide variety of organic diisocyanates may be employed to react with the glycols to prepare these polyurethane polymers, including aromatic, aliphatic and cycloaliphatic diisocyanates and combinations of these types. Mixtures of two or more organic diisocyanates may be used. Representative compounds include toluene-2,4-diisocyanate, m-phenylene diisocyanate, 4-chloro-1,3-phenylene diisocyanate, cumene-2,4-diisocyanate, anisole-2,4-diisocyanate, 4,4'-bisphenylene diisocyanate, 1,5-naphthalene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthalene diisocyanate. Arylene diisocyanates, that is, those in which each of the two isocyanate groups is attached directly to an aromatic ring, are preferred. Compounds such as toluene-2,4-diisocyanate in which the two isocyanate groups differ in reactivity are particularly desirable.

The following examples will better illustrate the nature of the present invention; however, the invention is not intended to be limited to these examples. Parts are by weight unless otherwise indicated. In these examples the following symbols are used:

MBTS—refers to 2,2'-dithiobisbenzothiazole, also known as benzothiazyl disulfide MBT—refers to 2-mercaptobenzothiazole Cd(MBT)₂—refers to

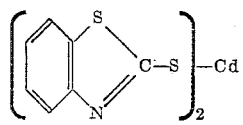

which is the cadmium salt of 2-mercaptobenzothiazole.

QTZ—refers to

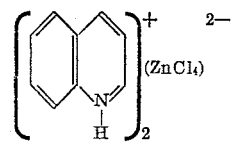

The following ASTM procedures are used for the tests carried out in the examples:

Heat build-up—D 623–52T (method A)
Compression set—D 395–53T (method B, 22 hrs., 70° C.

The stress-strain properties are determined using the Williams ring tester.

PREPARATION OF POLYMER A 3 mols of toluene-2,4-diisocyanate is added to 1 mol of 3-(allyloxy)-1,2-propanediol and the mixture obtained is agitated for 3 hours at 80° C. under an atmosphere of nitrogen. Then 2 mols of polytetramethyleneether glycol of molecular weight 1000 is added and the mass is agitated at 80° C. for 1 hour. Finally it is transferred to a polyethylene-lined container and heated in an oven at 80° C. for 72 hours. A rubbery polymer is obtained which has an average of one side chain allyloxy group for each 2650 units of molecular weight.

Representative examples illustrating the present invention follow.

Example 1

(A) *Compounding the elastomer.*—On a rubber roll mill three stocks are compounded. Each one contains 100 parts of polymer A, 30 parts of high abrasion furnace black, 1 part of sulfur, 2 parts of MBTS, and 1 part of MBT. Table I–1, which follows, lists the zinc salts and cadmium salts which are added to these stocks (parts are by weight based on 100 parts of polymer A).

TABLE I-1
Compounding variations

| Additive | Stock | | |
|---|---|---|---|
| | 1A | 1B | 1C |
| Zinc chloride | 0.1 | | 0.1 |
| Cadmium chloride | | 0.3 | 0.3 |

(B) *Curing the elastomer.*—Portions of these compounded stocks are cured in a press at 150° C. for 20 and 40-minute intervals. Some properties of the vulcanizates obtained are given in Table I–2 below.

TABLE I-2
Vulcanizate properties

| Property | Cure Time (Min.) | Stock | | |
|---|---|---|---|---|
| | | 1A | 1B | 1C |
| Comp. Set (Percent) at 70° C | 20 | 50 | 94 | 28 |
| | 40 | 31 | 80 | 23 |
| $T_B$ (p.s.i.) at 25° C | 20 | 5,050 | 2,610 | 5,040 |
| | 40 | 4,710 | 3,530 | 5,000 |
| $E_B$ (Percent) at 25° C | 20 | 420 | 680 | 420 |
| | 40 | 410 | 500 | 420 |
| $M_{300}$ (p.s.i.) at 25° C | 20 | 2,660 | 750 | 2,730 |
| | 40 | 2,790 | 1,550 | 2,720 |

Example 2

(A) *Compounding the elastomer.*—On a rubber roll mill two stocks are compounded. Each one contains 100 parts of polymer A, 30 parts of conducting channel black, 15 parts of di(2-ethylhexyl)phthalate, 1 part of sulfur, 3 parts of MBTS, and 1 part of MBT. Table II–1, which follows, lists the zinc salts and cadmium salts which are added to these stocks (parts are by weight based on 100 parts of polymer A).

TABLE II-1

Compounding variations

| Additive | Stock 2A | Stock 2B |
|---|---|---|
| $ZnCl_2$:MBTS | 0.35 | |
| Zn stearate | | 0.5 |
| $CdCl_2$ | | 0.3 |

(B) *Curing the elastomer.*—Portions of these compounded stocks are cured in a press at 140° C. for 30 and 90-minute intervals. Some properties of the vulcanizates obtained are given in Table II-2 below.

TABLE II-2

Vulcanizate properties

| Property | Cure Time (Min.) | Stock 2A | Stock 2B |
|---|---|---|---|
| $M_{300}$ (p.s.i.) at 25° C | 30 | 250 | 1,000 |
|  | 90 | 1,220 | 1,930 |
| $T_B$ (p.s.i.) at 25° C | 30 | 1,050 | 3,800 |
|  | 90 | 3,650 | 4,450 |
| $E_B$ (p.s.i.) at 25° C | 30 | 720 | 590 |
|  | 90 | 530 | 470 |
| Comp. Set (percent) at 70° C | 30 | 92 | 57 |
|  | 90 | 52 | 26 |
| Heat Build-up: [Final compression]−[Minimum compression]=$\Delta$Comp. (mils) $\Delta$C (mils). | 90 | (collapsed) | 5 |

Example 3

(A) *Compounding the elastomer.*—On a rubber roll mill two stocks are compounded. Each one contains 100 parts of polymer A, 30 parts of high abrasion furnace black, 15 parts of di(2-ethylhexyl)phthalate, 1 part of sulfur, 3 parts of MBTS, and 1 part of MBT. Table III-1, which follows, lists the zinc salts and cadmium salts which are added to these stocks (parts are by weight based on 100 parts of polymer A).

TABLE III-1

Compounding variations

| Additive | Stock 3A | Stock 3B |
|---|---|---|
| $ZnCl_2$:MBTS | 0.35 | |
| QTZ | | 0.37 |
| $Cd(MBT)_2$ | | 0.73 |

(B) *Curing the elastomer.*—Portions of these compounded stocks are cured in a press at 140° C. for 30, 60 and 90-minute intervals. Some properties of the vulcanizates obtained are given in Table III-2 below.

TABLE III-2

Vulcanizate properties

| Property | Cure Time (min.) | Stock 3A | Stock 3B |
|---|---|---|---|
| $M_{300}$ (p.s.i.) at 25° C | 30 | 750 | 1,700 |
|  | 60 | 1,890 | 2,130 |
|  | 90 | 1,940 | 2,150 |
| $T_B$ (p.s.i.) at 25° C | 30 | 2,750 | 4,000 |
|  | 60 | 4,500 | 4,200 |
|  | 90 | 4,750 | 4,250 |
| $E_B$ (percent) at 25° C | 30 | 610 | 490 |
|  | 60 | 470 | 450 |
|  | 90 | 490 | 450 |
| Comp. Set (percent) at 70° C | 30 | 100 | 64 |
|  | 60 | 38 | 25 |
|  | 90 | 25 | 16 |
| Heat Build-up: [Final compression]−[Minimum compression]=$\Delta$C (mils). | 30 | collapsed | 259 |
|  | 60 | 278 | 12 |
|  | 90 | 25 | 10 |

Example 4

(A) *Compounding the elastomer.*—On a rubber roll mill four stocks are compounded. Each one contains 100 parts of polymer A, 30 parts of high abrasion furnace black, and 1 part of sulfur. Table IV-1, which follows, lists the MBT, MBTS, and the zinc salts and cadmium salts which are added to these stocks (parts are by weight based on 100 parts of polymer A).

TABLE IV-1

Compounding variations

| Additive | Stock 4A | Stock 4B | Stock 4C | Stock 4D |
|---|---|---|---|---|
| MBTS | 2.75 | 2.75 | 3 | 3 |
| MBT | 1 | 0.45 | 0.45 | 1 |
| $ZnCl_2$:MBTS | 0.37 | 0.37 | | |
| Cd stearate | 1.11 | | | |
| $Cd(MBT)_2$ | | 0.73 | 0.73 | |
| QTZ | | | 0.37 | |
| Zn stearate | | | | 0.5 |
| $CdCl_2$ | | | | 0.3 |

(B) *Curing the elastomer.*—Portions of these compounded stocks are cured in a press at 140° C. for 30, 60, 90 and 120-minute intervals. Some properties of the vulcanizates obtained are given in Table IV-2 below.

TABLE IV-2

Vulcanizate properties

| Property | Cure Time (Min.) | Stock 4A | Stock 4B | Stock 4C | Stock 4D |
|---|---|---|---|---|---|
| $M_{300}$ (p.s.i.) at 25° C | 30 | 2,190 | 2,500 | 2,790 | 3,100 |
|  | 60 | 2,970 | 3,410 | 3,170 | 3,120 |
|  | 90 | 3,050 | 3,430 | 3,190 | 3,350 |
|  | 120 | 3,200 | 3,560 | 3,230 | 3,190 |
| $T_B$ (p.s.i.) at 25° C | 30 | 4,900 | 5,000 | 5,100 | 5,100 |
|  | 60 | 5,100 | 5,100 | 4,400 | 5,100 |
|  | 90 | 5,100 | 5,100 | 4,900 | 5,100 |
|  | 120 | 5,100 | 4,950 | 4,900 | 5,100 |
| $E_B$ (percent) at 25° C | 30 | 480 | 440 | 430 | 400 |
|  | 60 | 400 | 390 | 370 | 400 |
|  | 90 | 400 | 380 | 390 | 390 |
|  | 120 | 400 | 370 | 390 | 400 |
| Comp. Set. (percent) at 70° C | 30 | 52 | 52 | 44 | 32 |
|  | 60 | 25 | 22 | 18 | 18 |
|  | 90 | 16 | 16 | 17 | 16 |
|  | 120 | 16 | 13 | 16 | 14 |
| Heat Build-up $\Delta$C (mils): [Final compression]−[Minimum compression]=$\Delta$C (mils). | 30 | collapsed | 348 | 335 | 112 |
|  | 60 | 58 | 40 | 71 | 55 |
|  | 90 | 62 | 35 | 75 | 65 |
|  | 120 | | 46 | 76 | 78 |

Example 5

(A) *Compounding the elastomer.*—On a rubber roll mill four stocks are compounded. Each one contains 30 parts of conducting channel black, and 1 part of sulfur. Table V-1, which follows, lists the MBT, MBTS, and the zinc salts and the cadmium salts which are added to these stocks (parts are by weight based on 100 parts of polymer A).

TABLE V-1

Compounding variations

| Additive | Stock 5A | Stock 5B | Stock 5C | Stock 5D |
|---|---|---|---|---|
| MBTS | 2.75 | 2.75 | 3 | 3 |
| MBT | 1 | 0.45 | 0.45 | 1 |
| $ZnCl_2$·MBTS | 0.37 | 0.37 | | |
| Cd stearate | 1.11 | | | |
| $Cd(MBT)_2$ | | 0.73 | 0.73 | |
| QTZ | | | 0.37 | |
| Zn stearate | | | | 0.5 |
| $CdCl_2$ | | | | 0.3 |

(B) *Curing the elastomer.*—Portions of these compounded stocks are cured in a press at 140° C. for 30, 60, 90 and 120-minute intervals. Some properties of the vulcanizates obtained are given in Table V-2 below.

TABLE V-2

Vulcanizate properties

| Property | Cure Time (Min.) | Stock | | | |
|---|---|---|---|---|---|
| | | 5A | 5B | 5C | 5D |
| $M_{300}$ (p.s.i.) at 25° C | 30 | 1,450 | 1,130 | 1,510 | 1,670 |
| | 60 | 2,450 | 2,240 | 2,810 | 2,480 |
| | 90 | 2,770 | 2,760 | 2,850 | 2,680 |
| | 120 | 2,770 | 2,800 | 2,770 | 2,670 |
| $T_B$ (p.s.i.) at 25° C | 30 | 5,000 | 3,950 | 4,750 | 5,100 |
| | 60 | 5,100 | 4,900 | 5,100 | 5,100 |
| | 90 | 5,100 | 5,100 | 5,100 | 5,100 |
| | 120 | 5,100 | 5,100 | 4,950 | 5,100 |
| $E_B$ (percent) at 25° C | 30 | 550 | 570 | 530 | 520 |
| | 60 | 430 | 450 | 410 | 430 |
| | 90 | 410 | 420 | 400 | 420 |
| | 120 | 420 | 410 | 410 | 420 |
| Comp. Set (percent) at 70° C | 30 | 88 | 83 | 73 | 51 |
| | 60 | 33 | 33 | 30 | 26 |
| | 90 | 22 | 28 | 22 | 23 |
| | 120 | 20 | 21 | 20 | 20 |
| Heat Build-up $\Delta$C (mils): [Final compression]-[Minimum compression]= $\Delta$C (mils). | 30 | collapsed | collapsed | collapsed | collapsed |
| | 60 | 93 | 97 | 63 | 56 |
| | 90 | 49 | 49 | 50 | 63 |
| | 120 | 36 | 35 | 34 | 50 |

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of curing a sulfur-curable polyalkyleneether polyurethane elastomer, said elastomer having a side chain containing at least one terminal $CH=CH_2$ group for each 800 units of molecular weight of elastomer, said elastomer being selected from the group consisting of (A) the reaction product of (1) a polyalkylene ether glycol having a molecular weight of from about 750 to 10,000, (2) an organic diisocyanate, (3) a non-polymeric glycol, and, (B) the reaction product of (1) a bis-chloroformate of a polyalkyleneether glycol having a molecular weight of from about 750 to 10,000, (2) a bis-chloroformate of a non-polymeric glycol, and (3) a diamine taken from the group consisting of primary and secondary diamines, by heating with (*a*) from about 0.5 to about 2.0 parts sulfur per 100 parts, by weight, of polyurethane elastomer, (*b*) from about 0.45 to about 1.0 part 2-mercaptobenzothiazole per 100 parts polyurethane elastomer, (*c*) from about 2.0 to about 4.0 parts 2,2'-dithiobisbenzothiazole per 100 parts of polyurethane elastomer, the improvement which consists of conducting said heating at a temperature within the range of 100° C. to 170° C. in the presence of 0.03 to 0.20 part zinc and 0.045 to 0.45 part cadmium per 100 parts by weight of elastomer, said zinc and cadmium being present in the form of a member taken from the group consisting of (1) salts thereof where at least one of said salts is taken from the group consisting of a chloride, bromide and iodide, and, (2) complexes of said salts, said complexes being formed with a member taken from the group consisting of 2-mercaptobenzothiazole, 2,2'-dithiobisbenzothiazole and a heterocyclic tertiary amine having at least one unsubstituted position alpha to the nitrogen atom, the nitrogen atom of said tertiary amine being in the heterocyclic nucleus.

2. The process of claim 1 wherein zinc and cadmium compounds are generated in situ.

3. The process of claim 1 wherein the zinc is present as the 1:1 molar complex of zinc chloride with 2,2'-dithiobisbenzothiazole, and, the cadmium is present as cadmium stearate.

4. The process of claim 1 wherein the zinc is present as the 1:1 molar complex of zinc chloride with 2,2'-dithiobisbenzothiazole, and, the cadmium is present as the cadmium salt of 2-mercaptobenzothiazole.

5. The process of claim 1 wherein the zinc is present as zinc stearate, and, the cadmium is present as cadmium chloride.

6. The process of claim 1 wherein the zinc is present as zinc chloride and the cadmium is present as cadmium chloride.

7. The process of claim 2 wherein said zinc and cadmium compounds are generated from quinolinium tetrachlorozincate and the cadmium salt of 2-mercaptobenzothiazole, respectively.

8. In the process of curing a sulfur-curable polyalkyleneether polyurethane elastomer, said elastomer being the reaction product of (1) polytetramethyleneether glycol, (2) toluene-2,4-diisocyanate, and (3) 3-(allyloxy)-1,2-propane-diol, by heating with (a) from about 0.5 to about 2.0 parts sulfur per 100 parts, by weight, of said elastomer, (b) from about 0.45 to about 1.0 part of 2-mercaptobenzothiazole per 100 parts of said elastomer, (c) from about 2 to about 4 parts of 2,2'-dithiobisbenzothiazole per 100 parts of elastomer, the improvement which consists of conducting said heating at a temperature of about 140° C. in the presence of from about 0.03 to 0.20 part zinc and 0.045 to 0.45 part cadmium per 100 parts, by weight, of said polyurethane elastomer, said zinc and cadmium being present in the form of a member taken from the group consisting of (1) salts thereof where at least one of said salts is taken from the group consisting of a chloride, bromide and iodide, and, (2) complexes of said salts, said complexes being formed with a member taken from the group consisting of 2-mercaptobenzothiazole, 2,2'-dithiobisbenzothiazole and a heterocyclic tertiary amine having at least one unsubstituted position alpha to the nitrogen atom, the nitrogen atom of said tertiary amine being in the heterocyclic nucleus.

References Cited in the file of this patent

UNITED STATES PATENTS

| | | |
|---|---|---|
| 2,279,875 | Semon | Apr. 14, 1942 |
| 2,581,905 | Carr et al. | Jan. 8, 1952 |
| 2,808,391 | Pattison | Oct. 1, 1957 |
| 2,846,416 | Arnold et al. | Aug. 5, 1958 |